United States Patent [19]

Cantor

[11] Patent Number: 4,671,996
[45] Date of Patent: Jun. 9, 1987

[54] ADHESIVE PACKAGE

[75] Inventor: Stephen E. Cantor, Cheshire, Conn.

[73] Assignee: Uniroyal Chemical Company, Inc., Middlebury, Conn.

[21] Appl. No.: 710,819

[22] Filed: Mar. 12, 1985

[51] Int. Cl.$^4$ .................. C09J 7/02; B32B 27/08
[52] U.S. Cl. .................... 428/343; 428/355; 428/349; 428/519; 206/219
[58] Field of Search ............... 206/219; 428/35, 346, 428/342, 355, 349, 352, 519

[56] References Cited

U.S. PATENT DOCUMENTS

| | | | |
|---|---|---|---|
| Re. 30,843 | 1/1982 | Flint | 428/373 |
| 4,279,340 | 7/1981 | Lang | 206/219 |
| 4,326,632 | 4/1982 | Koob | 206/219 |

OTHER PUBLICATIONS

Adhesives AGe, Jun. 1974, vol. 17, No. 6, p. 17, S. E. Cantor, "RTV Adhesive System".
Ind. and Eng. Chem., vol. 38, p. 500 (1964) J. Rehner et al, "Vulcanization Reactions".

Primary Examiner—John E. Kittle
Assistant Examiner—James J. Seidleck
Attorney, Agent, or Firm—John A. Shedden

[57] ABSTRACT

An adhesive package comprising a first component including an EPDM polymer and p-quinone dioxime, a second component including an EPDM polymer and an inorganic peroxide, said first and second components separated by a film of 1,2-syndiotactic polybutadiene is disclosed. A process is also set forth for sealing EPDM sheet comprising disposing an adhesive melt, said melt comprising EPDM, p-quinone dioxime, an inorganic peroxide and 1,2-syndiotactic polybutadiene, upon a first EPDM sheet and overlapping the sheet, on which the adhesive has been disposed, with another EPDM sheet to be sealed to the first sheet.

10 Claims, No Drawings

4,671,996

ADHESIVE PACKAGE

BACKGROUND OF THE INVENTION

1. Field of the Invention

The instant invention is directed to an adhesive for sealing EPDM sheet. More particularly, the instant invention is directed to a two-component adhesive, chemically separated by a film which, upon heating, comes together to produce an adhesive effective to seal EPDM sheeting.

2. Background of the Invention

The increasing use of single-ply membranes, especially as roof coverings, has emphasized the need for development of excellent adhesives to seal seams to provide the same excellent leak-proof protection provided by the membranes themselves. The material of choice, and the roofing membrane enjoying the largest share in this market, is ethylenepropylene diene rubber (EPDM). Because of the resistance and inherent difficulties in employing more than a one-component system, the adhesive of choice in sealing this vulcanized EPDM sheet has been a chloroprene elastomer, i.e., neoprene, formulated in a suitable solvent. This one-component system relies on the inherent modulus and tensile properties associated with chloroprene. This adhesive does not provide the strength obtained by a vulcanizable product.

The one-component system of the prior art also, in common with many known adhesive systems, is characterized by the presence of an organic solvent. The presence of organic solvents increases the danger of combustion or explosion. In addition, the toxicity and environmental problems associated with solvents are well known.

As mentioned above, roofing installers resist the use of a two-component system which requires exact mixing of the two components. Moreover, expensive losses of activated cements are incurred due to the short pot lives of these materials. It is true that expensive two-component systems have been developed. These packaged systems, for example, so-called "Bi-Packs", are special coaxial cartridges, which mix a premeasured amount of sealant as required for on-site application and are characterized by their high price.

A two-component adhesive for EPDM sheet is disclosed in the art. Flory, et al., *Ind. Eng. Chem*, Vol. 38, 500 (1964), discloses the use of a combination of p-quinone dioxime and lead dioxide as an ambient curing agent for EDPM. Cantor, *Adhesive Age*, June, 1974, teaches a two-component adhesive comprising p-quinone dioxime and an organic oxidant.

SUMMARY OF THE INVENTION

The instant invention is directed to a new adhesive for bonding vulcanzied EPDM sheet which provides the advantages, and overcomes the disadvantages, of the one-component and two-component adhesive systems of the prior art. This new adhesive provides the simplicity of application provided by one-component systems in combination with the bonding strength of the two-component systems of the prior art. At the same time that this new system eliminates the inferior bonding strength of the one-component adhesive systems it overcomes the difficult and expensive operating conditions encountered with the two-component systems of the prior art. The present adhesive additionally is characterized by the absence of solvents eliminating safety and environmental difficulties associated with the adhesives of the prior art.

In accordance with the instant invention, an adhesive package is provided. The package includes a first component which comprises an EPDM polymer and p-quinone dioxime, a second component comprising an EPDM polymer and an inorganic peroxide, and a film of 1,2-syndiotactic polybutadiene separating the first and second components and preventing contact therebetween.

In further accordance with the instant invention, a method for sealing vulcanized EPDM sheet is provided. In this method, an adhesive melt which includes EPDM, p-quinone dioxime, an inorganic peroxide, and 1,2-syndiotactic polybutadiene, is disposed between overlapping sheets of vulcanized EPDM.

DETAILED DESCRIPTION OF THE INVENTION

The instant invention is directed to an adhesive package which includes a first component comprising EPDM and p-quinone dioxime. The package also includes a second component comprising EPDM and an inorganic peroxide. Preferably the inorganic peroxide is selected from the group consisting of lead, magnesium, calcium, zinc and manganese peroxide. Of these, lead peroxide is particularly preferred. The package is furthermore characterized by a film of 1,2-syndiotactic polybutadiene (1,2-SPD) wrapped about the two components, such that contact between the two components is avoided.

In a preferred embodiment, the first and second components are separately wrapped with 1,2-SBD film to form two separate packages. The two packages are then wrapped in 1,2-SBD film to form a single package.

Each of the two components which makes up the adhesive package of this invention includes EPDM. Preferably, these two adhesive components additionally include additives provided in rubbers to enhance their strength, oxidation resistance, viscosity modifying properties, and the like. In a preferred embodiment, each component of the adhesive package includes carbon black, other rubber components such as butyl rubber, and polyolefins, for example, polybutene. In addition, an inert filler, such as talc, plasticizers and softening agents may be included. Furthermore, a processing oil, to make the adhesive more workable and produce lower viscosity, is oftentimes provided. Finally, an antioxidant, for example, zinc oxide, may be incorporated into the adhesive package.

Each component of the adhesive package may additionally include other ingredients. For example, in a preferred embodiment not only is a relatively high molecular weight butyl rubber provided, but also a closely related polymer, a butyl rubber possessing lower molecular weight, is also included.

In a preferred embodiment, the same additions are provided in both the first and second components.

In addition to the two components discussed above, the adhesive package of the instant invention comprises 1,2-syndiotactic polybutadiene (1,2-SBD) film. At ambient temperature, this polymeric film is a thermoplastic. It provides, because of its inertness, excellent barrier properties necessary to ensure that the two components do not react with each other. Uniquely, at elevated temperature, 1,2-SBD has the ability to crosslink to a thermosetting resin. In effect, it has the properties of a vulcanizable elastomer. That is, at elevated temperature and under the influence of one or more curing agents, it crosslinks to produce a thermosetting polymer, just as a rubber vulcanizes under these same conditions.

In operation, an adhesive package of the present invention is formed by preparing a first component, a mixture of EPDM, p-quinone dioxime and, optionally, one or more of the other ingredients described above, which is wrapped in 1,2-SBD film. A second component, a mixture of EPDM, an inorganic peroxide and optionally one or more of the other ingredients described earlier is prepared and also wrapped in 1,2-SBD film. The two components are maintained apart. Thus, they may be wrapped separately and then the two packages are wrapped in 1,2-SBD film to form a single package. Alternately, the two components may be wrapped in 1,2-SBD film as a single package as long as tne two components remain apart. At ambient temperature the package is inert. However at elevated temperature, i.e., about 80° C., the 1,2-SBD melts, causing the first and second components to m:x. At this elevated temperature, the EPDM and curing agents in the first and second components effect crosslinkage of the EPDM serving as an adhesive bond. Uniquely, since the 1,2-SBD acts as a thermosetting resin, it also cures as part of the adhesive bond. Thus, the 1,2-SBD, which serves as a barrier prior to activation, also contributes to enhance the effectiveness of the adhesive.

In another aspect of the present invention, a process is provided for sealing EPDM sheet. In this aspect of the invention, an adhesive melt, the adhesive melt comprising EPDM, p-quinone dioxime, an inorganic peroxide and 1,2-syndiotactic polybutadiene, is disposed between overlapping EPDM sheets thereby sealing the overlapped sheets together.

In a preferred embodiment, the adhesive package described above is disposed in a device capable of heating and applying the molten product of the adhesive package, the adhesive melt, upon the EPDM sheet to be bonded. Preferably, such a device is an extruder gun which both heats and aids in applying the resultant molten product of such heating. In an especially preferred embodiment, the extruder gun is handheld permitting an installer to seal the sheet at the place of installation. In order to provide a melt that cools to a cured adhesive bond, it is preferable that the first and second components and the 1,2-SBD be exposed, in the extruder gun, to a temperature not in excess of 375° F. More preferably, the application temperature, of the temperature of the adhesive package in the extruder gun, is between 325° and 350° F.

In a preferred embodiment, the vulcanized EPDM sheet to be bonded is treated with a chlorinating agent such that the surface of the vulcanized EPDM sheet is chlorinated. Although the operation of this invention should not be predicated on any theory of operation, it is hypothesized that the chlorinated surface of the EPDM interacts with the p-quinone dioxime to increase the degree of curing at the interface.

In the preferred embodiment wherein the EPDM sneet is chlorinated, the chlorinating agent employed is preferably 1,3-dichloro-5,5-dimethylhydantoin. Of course, other chlorinating agents known to those skilled in the art may alternatively be employed.

In the process of bonding vulcanized EPDM sheet together, it is preferred that the bond be based on a lap seam. That is, the first sheet is disposed over a second sheet with the molten adhesive disposed therebetween.

The following examples are given to illustrate the scope of the instant invention. Therefore, the instant invention should not be limited thereto.

EXAMPLE 1

Preparation of Adhesive Components

One hundred thirty parts of EPDM having a Mooney Viscosity ML 1+4 at 125° C. of 60 and a 68/32 ethylene to propylene ratio; 163 parts of N650 Black, a general purpose furnace carbon black manufactured by Ashland Chemical Co.; 39 parts of Mistron Vapor (a trademark of Cyprus Industrial Mineral Corp.), a magnesium silicate of specific gravity, 2.75; 6.5 parts of zinc oxide; and 120 parts of Sunpar 2280 (a trademark of Sun Oil Co.), a paraffinic processing oil, all parts being by weight, were mixed in a Banbury mixer to produce a masterbatch.

Three hundred forty-four parts of the masterbatch were mixed in a sigma blade internal mixer at a temperature ranging from 200° to 225° F. with 100 parts of Butyl XL-20 (a trademark of Polysar Corp.), an extensively crosslinked isoprene/isobutylene copolymer; 120 parts of Vistanex LM MH (a trademark of Exxon Chemical Co.), a low molecular weight, permanently tacky, very viscous liquid or semi-solid polyisobutylene copolymer; 70 parts of Staybelite Resin #10 (a trademark of C. P. Hall and Co.), a glycerin ester of a hydrogenated rosin; 40 parts of Indopol H-100 ( a trademark of Amoco Chemical Co.), a high molecular weight polybutene; 4.5 parts of Silane A-1893 (a trademark of Union Carbide Corp.), a glycidoxypropyl trimethoxysilane; and 7.5 parts of p-quinone dioxime, all parts being by weight, to form a smooth soft material denoted as the first component.

Another mixture was prepared in exact accordance with the mixture identified as the first component except for the omission of the 7.5 parts of p-quinone dioxime. In the second mixture, the p-quinone dioxime was replaced with 18 parts of lead peroxide. Again, the 344 parts of masterbatch were mixed with the same ingredients in the same proportions added to produce the first component, to produce, after 45 minutes, a smooth soft material referred to as the second component.

EXAMPLE 2

Preparation of Adhesive Package

The first and second components were separately fed into a hand-held extruder gun (Hardman Corp. Model No. 240), to produce beads of material which were placed on silicone-release paper. A suitable length of 1,2-SBD film, 45 microns thick, was cut and placed over and around each of the beads of the first and second components that were disposed on the release paper. A second length of tape was placed on top of the two protected tapes and a final wrap of the 1,2-SBD film was used to cover the entire package. The dual tape was rolled into a coil, ready for insertion into the entrance port of a suitable extruder gun.

EXAMPLE 3

Sealing of EPDM Sheet

Production samples of single-ply vulcanized EPDM roofing membranes were cut into strips 28 inches long by 1½ inches wide. These strips were wiped several times with n-heptane until a cheese cloth displayed carbon black. The thus cleaned strips were sealed in accordance with procedure given below within one hour of this cleaning treatment.

Adhesive packages, made in accordance with Example 2 were inserted into an extruder gun (Handman Corp. Model No. 240) and therein heated to a temperature in the range of 325° F. and 350° F. A hot sealant bead from the extruder gun was disposed in uniform thickness on the surface of one of the cleaned EPDM strips. (It is noted that no trace of film wrap was evidenced in the hot adhesive exiting the extruder gun.)

An identical cleaned EPDM strip was disposed over the EPDM strip on which the adhesive was placed. The thus formed laminate assembly was pressed together with a 5 pound roller at least five times. Several such assemblies were formed.

Two sets of laminates were produced in this example. One employed an adhesive thickness of 1.2 mm, the other, 2.6 mm.

EXAMPLE 4

Testing of the EPDM ADhesive Assemblies

The laminate assemblies formed in Example 4 were allowed to harden for seven days. Some of the laminate assemblies were maintained at room temperature and others were kept in an oven maintained at 70° C. At the conclusion of the seven-day period, the 1½"×28" strips were trimmed to 1"×6" test specimens.

The 1"×6" specimens were tested to determine the peel strength of the adhesive, a key characteristic of an adhesive, in accordance with ASTM Method D1876-T-Peel at a rate of 2 inches per minute. The testing was conducted at ambient (room) temperature and at 70° C. in accordance with their earlier storage history. The result of this testing is summarized in Table 1.

COMPARATIVE EXAMPLES 1-2

Identical EPDM strips were prepared in accordance with the procedure of tne first paragraph of Example 3. However, instead of using the adhesive of Example 2, two neoprene adhesive compositions usually employed to seal EPDM strips, were applied to a clean surface of the 1½ inch by 28 inch EPDM strips and covered by a second such strip. Again, a 5 lb. roller pressed the laminate assembly at least five times and the laminate was undisturbed for seven days at either room temperature or in an oven maintained at 70° C. The strips were trimmed to 1 inch by 6 inches and tested in accordance with the procedure defined in Example 4. The results of these tests using two Neoprene based single component adhesives formulated in a solvent system are summarized in Table 1.

TABLE 1

| Adhesive | T-Peel at 2 inches/Minute, in Pounds/Linear Inch | |
|---|---|---|
| | At Room Temperature | At 70° C. |
| Example 4 (1.2 mm Thick) | 8.2 | 1.2 |
| Example 4 (2.6 mm Thick) | 17.3 | 3.5 |
| Neoprene (C.E. 1) | 2.5 | 1.3 |
| Neoprene (C.E. 2) | 4.8 | 0.2 |

Table 1 demonstrates that the adhesive of the present invention is superior in forming a lap seam over the adhesives used in the prior art to seal EPDM sheet. Table 1 also establishes that employing the adhesive of the present invention in a greater thickness permits a more uniform stress distribution and a consequent higher load capacity.

COMPARATIVE EXAMPLE 3

The procedure of Examples 1-4 was repeated but for the application of the adhesive of the present invention through the extruder gun at a temperature of between 380° and 425° F. The adhesive so applied to the EPDM sheeting failed to develop adhesion between the sheets. The adhesive bead exiting the extruder gun was rough, semi-cured material. At these elevated temperatures, the two component system was overcured.

EXAMPLES 5-7

Effect of Chlorinated EPDM Surface

The lap seal test of Example 4 was repeated in a series of runs in which duplicate applications of the same adhesive compositions were extruded from an extruder gun at the same temperature upon EPDM sheets, prepared in accordance with the procedure of Example 3. In one of the two application, the EPDM was cleaned in accordance with the procedure of Example 3. In the other, the surfaces which were later contacted with the adhesive were cleaned with a solvent (n-heptane) that included 1% of 1,3-dichloro-5,5-dimethylhydantoin. In each case, an adhesive thickness of 2.6 mm was applied. The samples were bonded in accordance with Example 4 and aged at room témperature and in an oven at 70° C. for seven days prior to testing. Testing, to determine peel strength in pounds per linear inch (pli), was in accordance with the procedure of Example 4. The results of these examples appear in Table 2.

TABLE 2

| | T-Peel at 2 inches/Minute In Pounds/Linear Inch | |
|---|---|---|
| Example No. | At Room Temperature | At 70° C. |
| 5 (Untreated) | 17.3 | 3.5 |
| 5 (Chlorinated) | 18.8 | 3.3 |
| 6 (Untreated) | 17.4 | Undetermined |
| 6 (Chlorinated) | 18.2 | 2.9 |
| 7 (Untreated) | 15.5 | 3.9 |
| 7 (Chlorinated) | 19.4 | 3.4 |

EXAMPLES 8-10

Effect of Chlorinated Surface

The procedure of Examples 5-7 was repeated using the two-component adhesive of the present invention. However, in these examples the adhesive thickness applied between EPDM sheets was 1.2 mm. The results of tnese examples are tabulated in Table 3.

TABLE 3

| | T-Peel at 2 inches/Minute In Pounds/Linear Inch | |
|---|---|---|
| Example No. | At Room Temperature | At 70° C. |
| 8 (Untreated) | 8.2 | 1.2 |
| 8 (Chlorinated) | 10.5 | 1.4 |
| 9 (Untreated) | 10.2 | 1.4 |
| 9 (Chlorinated) | 10.6 | 1.7 |
| 10 (Untreated) | 7.7 | 1.1 |
| 10 (Chlorinated) | 7.9 | 1.2 |

The results of Examples 5-10 establish that the surfaces treated to provide a chlorinated surface produce noticeably improved T-peel strength over the untreated surfaces at room temperature. At elevated temperature, the effect of chlorination is hardly noticeable. Indeed, the thicker application (2.6 mm) at elevated temperature results suggest that employing a chlorinated surface is marginally inferior to the untreated surface application procedure.

EXAMPLES 11-14

Testing of Other Inorganic Peroxides

Adhesive compositions were made in accordance with Example 1 with the exception that the component incorporating the inorganic peroxide, lead peroxide, was replaced with the same number of parts by weight, 18 parts, of manganese peroxide in Example 11. In Example 12, the 18 parts of lead peroxide was replaced with 18 parts of calcium peroxide. Eighteen parts of zinc peroxide was used in Example 13 instead of the 18 parts of lead peroxide. Magnesium peroxide (18 parts) replaced lead peroxide in Example 14. In each case, the adhesive component that included p-quinone dioxime was unchanged. Moreover, the ingredients in the component that included the inorganic peroxide were exactly as recited in Example 1, but for the identity of the inorganic peroxide employed.

Each adhesive was fabricated in an adhesive assembly wrapped in 1,2-SBD film in accordance with Example 2 and was applied to provide a lap seal of EPDM strips in accordance with the procedure of Example 3. The thus formed seals were tested in accordance with Example 4, at room temperature employing an adhesive thickness of 2.6 mm. The results of these tests (with the result of the adhesive of Example 1 included for comparison) is summarized in Table 4.

TABLE 4

| Example No. | Peroxide | T-Peel Strength, PLI |
|---|---|---|
| 1 | Lead Peroxide | 17.3 |
| 11 | Manganese Peroxide | 11.9 |
| 12 | Calcium Peroxide | 12.3 |
| 13 | Zinc Peroxide | 11.8 |
| 14 | Magnesium Peroxide | 15.5 |

All of the strengths reported in Table 4 are significantly in excess of the results obtained by the use of the adhesives of the prior art used to seal EPDM.

The preferred embodiments and examples given above illustrate the scope and spirit of the instant invention. These embodiments and examples will make apparent, to those skilled in the art, other embodiments and examples. These other embodiments and examples are within the contemplation of the present invention. Therefore, the instant invention should be limited only by the appended claims.

What is claimed is:

1. An adhesive package comprising:
   a first component including an EPDM polymer and p-quinone dioxime;
   a second component including an EPDM polymer and an inorganic peroxide;
   said first and second components separated by a film of 1,2-syndiotactic polybutadiene.

2. A package in accordance with claim 1 wherein said first and second components are separately wrapped in said 1,2-sydiotactic polybutadiene film to form two packages and then said separately wrapped packages are wrapped together in said 1,2-syndiotactic polybutadiene film.

3. A package in accordance with claim 1 wherein said first and second components include a filler.

4. A package in accordance with claim 3 wnerein said first and second components comprise an antioxidant.

5. A package in accordance with claim 4 wherein said first and second components comprise a processing oil.

6. A package in accordance with claim 1 wherein said first and second components comprise an additional rubber.

7. A package in accordance with claim 6 wherein said additional rubber is butyl rubber.

8. A package in accordance with claim 1 wherein said first and second components comprise carbon black.

9. A package in accordance with claim 1 wherein said inorganic peroxide is selected from the group consisting of lead peroxide, magnesium peroxide, calcium peroxide, zinc peroxide and maganese peroxide.

10. A package in accordance with claim 1 wherein said inorganic peroxide is lead peroxide.

* * * * *